United States Patent [19]

Bar-Lev

[11] Patent Number: 5,754,913
[45] Date of Patent: May 19, 1998

[54] SHEET TRANSPORTING

[75] Inventor: Assa Bar-Lev, Chestnut Hill, Mass.

[73] Assignee: ECRM Incorporated, Tewksbury, Mass.

[21] Appl. No.: 668,967

[22] Filed: Jun. 18, 1996

Related U.S. Application Data

[60] Provisional application No. 60/002,249 Jun. 20, 1995.
[51] Int. Cl.$^6$ .................................................. G03D 3/08
[52] U.S. Cl. ............... 396/612; 355/27; 226/195; 492/28; 492/30
[58] Field of Search ........................ 396/612, 616; 226/193, 195, 118; 492/28, 30, 31; 355/27–29, 40, 44, 72; 271/227; 318/685

[56] References Cited

U.S. PATENT DOCUMENTS

| | | | |
|---|---|---|---|
| 3,645,619 | 2/1972 | Burton et al. | 355/40 |
| 3,904,145 | 9/1975 | Steinberger et al. | 226/195 |
| 3,904,354 | 9/1975 | Moser | 226/193 |
| 4,006,395 | 2/1977 | Reesen | 318/685 |
| 4,025,005 | 5/1977 | Fleck | 226/34 |
| 4,260,234 | 4/1981 | Burton | 396/612 |
| 4,508,524 | 4/1985 | Romangnoli | 493/11 |
| 4,652,117 | 3/1987 | Kogane et al. | 355/72 |
| 4,757,353 | 7/1988 | Kitai et al. | 355/44 |
| 4,787,544 | 11/1988 | Jones | 226/118 |
| 4,978,111 | 12/1990 | Kosugi et al. | 271/227 |
| 5,057,861 | 10/1991 | Maeda et al. | 355/27 |
| 5,344,058 | 9/1994 | Baffo | 226/181 |
| 5,383,591 | 1/1995 | Thibert | 226/108 |

FOREIGN PATENT DOCUMENTS

| | | |
|---|---|---|
| 2 688 770 | 9/1993 | France. |
| 63-272733 | 11/1988 | Japan. |
| 1013342 | 1/1989 | Japan. |
| 3238248 | 10/1991 | Japan. |
| 4256654 | 9/1992 | Japan. |
| 6347908 | 12/1994 | Japan. |
| WO 9120016 | 12/1991 | WIPO. |
| WO 92/15512 | 9/1992 | WIPO. |

*Primary Examiner*—D. Rutledge
*Attorney, Agent, or Firm*—Hale and Dorr LLP

[57] ABSTRACT

In a system for transporting film materials, rotation of the transported film caused by uneven stress across a width of the film is eliminated by providing a pinch roll drive in which the driven roll is a precision metal roll and the non-driven roll is a rubber roll, the outer cylindrical surface of which is defined by a plurality of axially-spaced annular ribs. Accumulated error is removed at regular intervals by braking the film to cause correction of slippage. Feed under uniform stress is achieved by forming a dancer roll film loop and correcting for differential alignment of the various transport rolls by displacing a portion of one side of the loop.

33 Claims, 3 Drawing Sheets

SHEET TRANSPORTING

CROSS REFERENCE TO RELATED APPLICATION

This application is related to provisional application Ser. No. 60/002,249, filed Jun. 20, 1995, which is expressly incorporated herein by reference.

FIELD OF INVENTION

This invention relates to transporting sheet material and, more particularly, to accurate transport of recording film in image setters.

BACKGROUND OF INVENTION

In high resolution film recording systems in which film is moved with drive rolls for exposure to a laser beam one line at a time, it is important precisely to control the transport of the film. If the film is even slightly mis-aligned, the recorded image may display unwanted artifacts and therefore be flawed. It is important to insure that the film is transported straight, in a direction perpendicular to the axes of its drive rolls and to the line of the laser beam, without shifting the film axially along one of the rolls or in the direction of the beam, and without rotating or skewing the film.

Typically, the film is driven through a pair of pinch rolls, at least one of which is covered with a rubber layer and the other of which is usually metal, although the latter also may be rubber covered. When a combination of a metal roll and a rubber roll is used, the driven roll is typically the rubber roll, typically a soft rubber that grips the film more readily than does a harder rubber or metal surface. However, the use of a driven rubber roll has been found to present a significant disadvantage: under the best of circumstances, the variation in diameter along the length of a rubber roll is on the order of 0.0005 to 0.001 inches (12.7 to 25.4 microns), and this degree of variation in the driven roll produces significant inaccuracy in the transport of the film. For example, with a typical driven rubber roll of about one inch (2.54 cm) in diameter, a variation in the diameter of as little as 0.001 inch (25.4 microns) produces an accumulated error about ten times that in but a single approximately 24 inch (61 cm) long image.

There remains a need for a film transport system which (a) avoids the skew and shift caused by the lack of precision in a drive roll diameter, (b) intermittently corrects alignment and accumulated error, and (c) feeds the film under uniform stress.

SUMMARY OF INVENTION

This invention provides a system for accurate transport of film materials. In a first aspect of the invention, rotation of the driven film caused by, for example, uneven stress across the width of the film is eliminated by providing a pinch roll drive in which the driven roll is a precision metal roll and the outer cylindrical surface of the non-driven roll, preferably rubber, is defined by a plurality of axially-spaced and displaceable annular ribs. In a second aspect of the invention, accumulated error, another cause of inaccurate transport, is removed at regular intervals, e.g., every page length, by braking the film at the inlet to cause correction of slippage. In a third aspect, feeding under uniform stress is achieved by forming a dancer roll film loop and correcting for differential alignment of the various transport rolls by displacing a portion of one side of the loop.

DESCRIPTION OF PREFERRED EMBODIMENT

Figure 1:
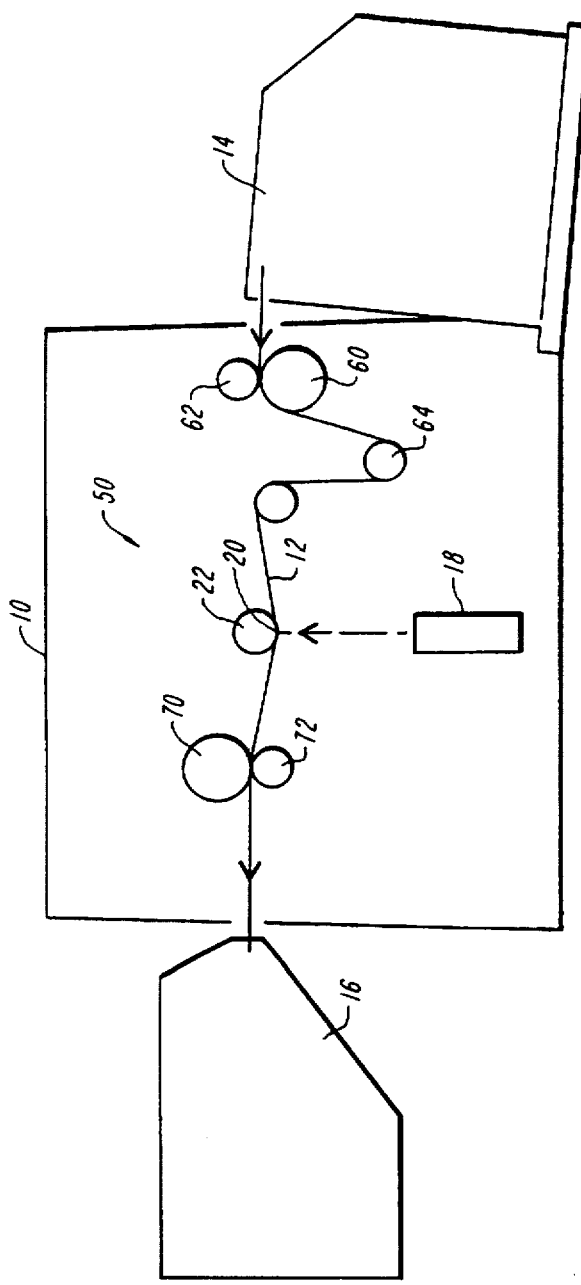
FIG. 1 is schematic of a film recorder embodying the present invention.

Referring more particularly to the drawings, FIG. 1 shows a film recorder, generally designated 10, in which a precision image is recorded on film 12 as the material is advanced (right-to-left) from a supply cassette 14 through film recorder 10 to a take-up cassette 16. In film recorder 10, the film is exposed by a laser 18 along an image line 20 as the film passes over a precision idler roll 22.

Recorder 10 has a film transport system 50 that is shown in more detail in FIGS. 2–5. As most clearly shown in FIG. 2, film transport system 50 includes a inlet pinch roll drive, generally designated 52, arranged for drawing unexposed film 12 from supply cassette 14 into recorder 10; a dancer roll assembly generally designated 54; an idler roll 56 between dancer roll assembly 54 and precision idler roll 22 at which the film is exposed; and an outlet pinch roll drive, generally designated 58, arranged for drawing film 12 past the idler roll 22 at which the film is exposed and then for pushing the exposed film into take-up cassette 16.

Inlet pinch roll drive 52, idler roll 56, and precision idler roll 22 are conventional. Pinch roll drive 52 includes a driven rubber roll 60 and a non-driven metal roll 62. Idler rolls 22 and 56 are metal rolls.

Dancer roll assembly 54 includes a metal dancer roll 64, the opposite ends of which are mounted in vertical slots 66 of a pair of support plates 68. Dancer roll 64 is free to move vertically with the ends of the axle on which it is mounted in slots 66.

Outlet pinch roll drive 58 includes a precision (e.g., diameter constant within tolerances of ±0.0002 or ±0.0001 inches (±5 or ±2.5 microns)) metal driven roll 70 and a non-driven softer rubber roll 72. Rubber roll 72 is shown more clearly in FIGS. 3 and 4 and will be described in detail hereinafter.

It will be noted that the tops of inlet drive roll 60, idler roll 56, and non-driven rubber roll 72 lie in substantially the same horizontal plane, and that precision roll 22 is mounted slightly below the plane to insure that the surface of the film 12 passing over roll 22 is held tightly against roll 22 as it is exposed by laser 18 along line 20. At the inlet side of recorder 10, inlet pinch roll drive 52 draws film 12 slightly upwardly from supply cassette 14 and over the top of inlet drive roll 60. Outlet pinch roll drive 58 draws the film around dancer roll 64, over idler roll 56, and under precision idler roll 22 where the film is exposed. Outlet pinch roll drive 58 then pushes the exposed film into take-up cassette 16.

Figure 3:
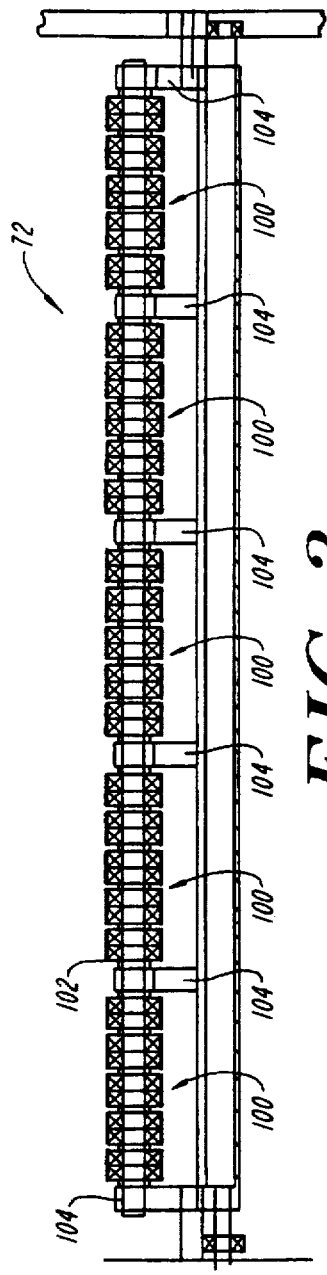
FIGS. 3 and 4 are side views of a non-driven roll in the system of FIG. 2.
Figure 4:
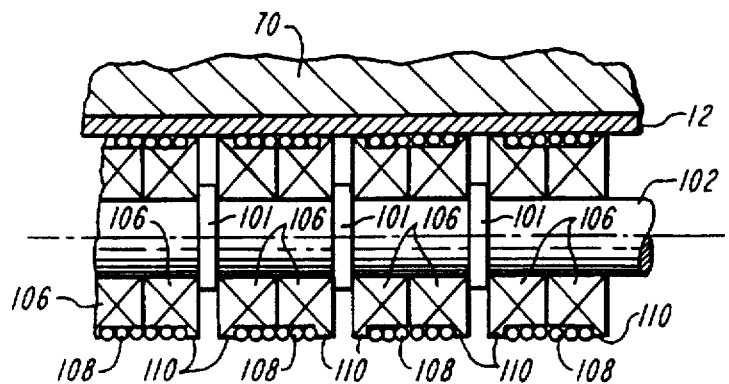

Reference is now made to FIGS. 3 and 4 which illustrate the construction of soft rubber roll 72. As shown, roll 72 includes five axially-spaced roll sections 100, all of which are mounted coaxially on a common shaft 102. Shaft 102 is mounted for rotation with supports 104 that are both at the ends of shaft 102, and also intermediate adjacent pairs of roll sections 100. Each roll section 100 includes five split bearings 106, each of which has an outer circumferential surface which carries six O-rings 108. An annular flange 110 is provided at opposite ends of each split bearing 106 in the axial direction to maintain O-rings 108 in place. Spacing washers 101 are provided between each pair of split bearings 106, and also between split bearings 106 at the ends of each section 100 and adjacent supports 104. As illustrated somewhat schematically in FIG. 4, film 12 is pinched between metal driven roll 70 and the outer surfaces of the O-rings 108 of non-driven roll 72.

Figure 5:
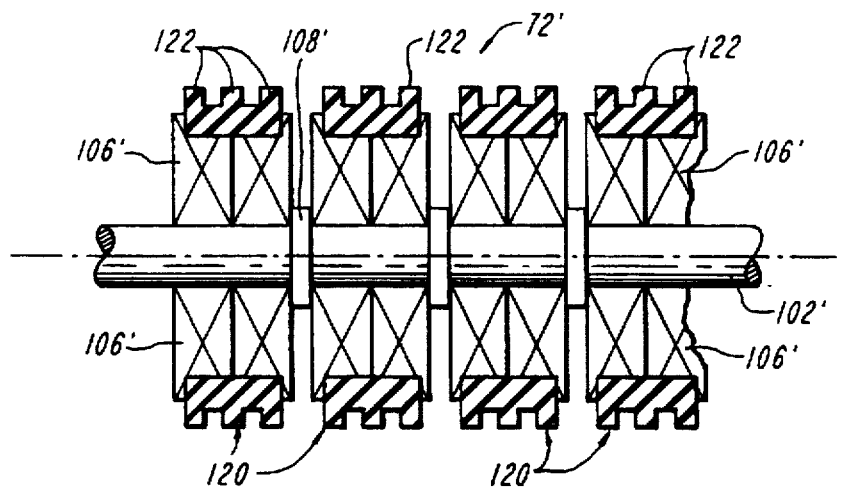
FIG. 5 is a side view of an alternative embodiment of the non-driven roll of FIGS. 3 and 4.

FIG. 5 illustrates an alternative embodiment in which the non-driven roll, designated 72', includes ribbed molded rubber rings 120 rather than O-rings 108. In the embodiment of FIG. 5, each ring 120 fits tightly around the periphery of a bearing 106', and spacers 108' are provided between adjacent bearings 106. As shown, each rubber ring 120 includes a number of axially-spaced, radially-projecting annular ribs 122, with a space between each rib that is about the same as, or slightly less than, the width of the rib. When roll 72' is used as part of the output pinch roll drive 58 in a recorder such as recorder 10, film 12 is pinched between the outer circumferential surfaces of ribs 122 and precision metal driven roll 70.

It will be recognized that the coefficient of friction between film 12 and rubber O-rings 108 (or ribs 122) is greater (typically about 0.5) than that between film 12 and driven roll 70 (typically about 0.1). However, the system of the present invention nonetheless permits the transport of film 12 through output pinch roll drive 58 to be controlled by precision metal driven roll 70 rather than by a rubber roll having a diameter with less precision. In the direction of film transport, i.e., perpendicular to the axes of the rolls, free movement of the rubber in contact with the film is ensured by bearings 106, 106'. In the cross-direction, parallel to the axes of the rolls, the resiliency of O-rings 108 and ribs 122 (and the small spacing between the ribs) permits the outer periphery of rings 108 and ribs 122 to move slightly, while still in contact with film 12, against an axially-directed force that is much too small to overcome the substantial frictional force between film 12 and driven roll 70. Any particular portion of O-ring 108 or rib 122 remains in contact with film 12 for only a very few degrees of rotation and then moves back into its normal, stress-free configuration as soon as that particular portion moves out of contact with film 12. This fact insures that there is no buildup of force or stress that would otherwise permit rubber roll 72, 72', rather than precision metal driven roll 70, to control the film transport.

It will be recognized that it is desirable for the film being transported through recorder 10 to be under constant stress/tension. It will also be recognized that, as is conventional, rolls 60, 62, 56, 22, 70, and 72 are mounted in recorder 10 with their respective axes as nearly parallel to the axes of the other rolls as possible. However, absolute parallelism, as a practical matter, cannot be achieved. The undesirable result of any such lack of parallelism, and also of any non-uniformity in the diameter of the rolls, particularly the driven rolls is nonuniform stress across the width of the film and the likelihood that one edge of the film will be advanced at a slightly different speed that the other. This problem is, to a major degree, solved by dancer roll assembly 54.

Figure 2:
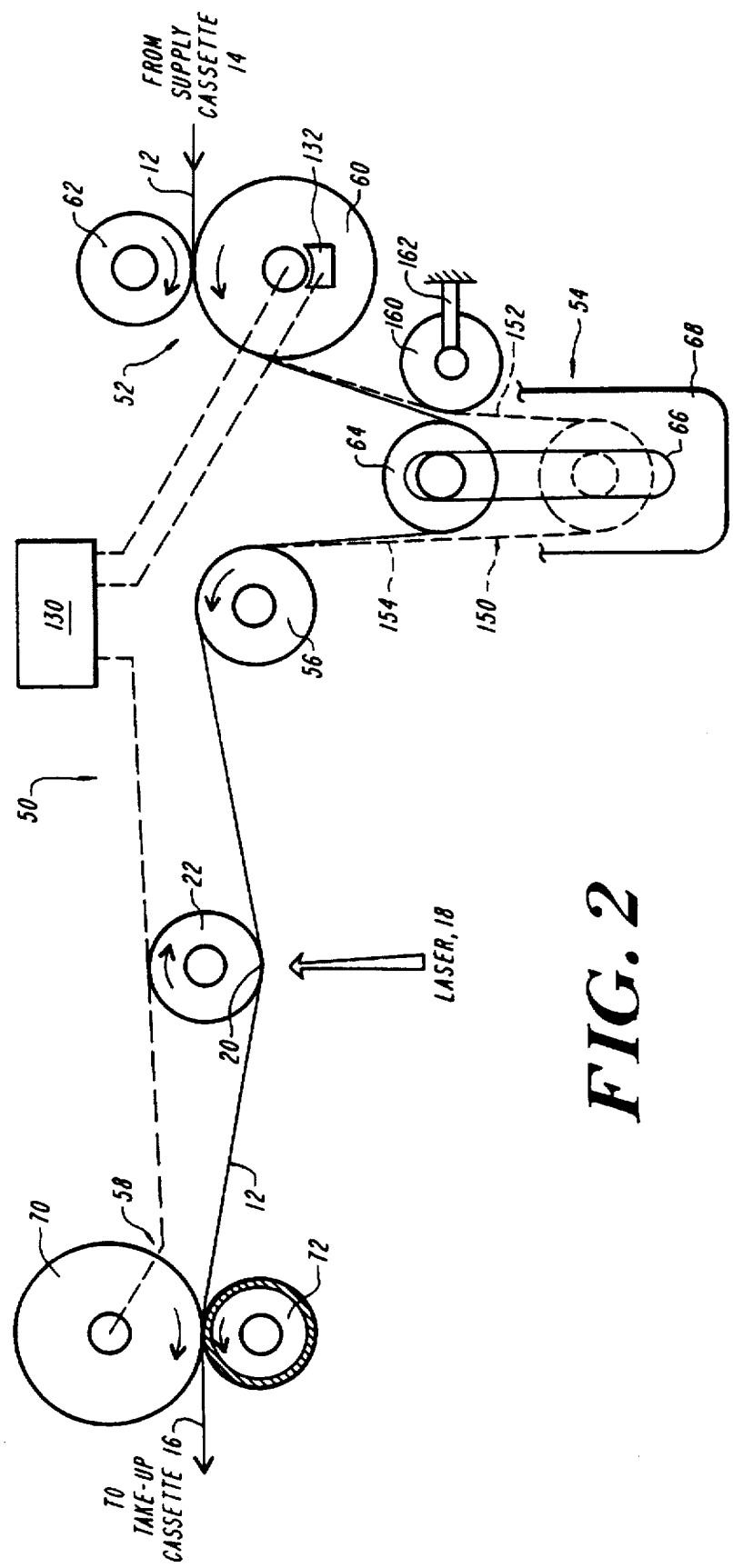
FIG. 2 is a pictorial view of the film transport of the film recorder of FIG. 1.

As indicated in FIG. 2, dancer roll 64 is mounted with its ends in slots 66, and is movable vertically between an upper position (shown in FIG. 2) in which the ends of the roll engage the top of slots 66, and a lower position in which the ends of the roll engage the bottom of the slots 66. FIG. 2 illustrates, using dashed lines, a typical "in-use" situation in which the weight of dancer roll 64 causes it to form a generally U-shaped loop 150 of film 12. Dancer roll 64 rides at the bottom of the loop, somewhere between the top and bottom of slots 68 but typically closer to the bottom of slots 66 than to the top. The size of loop 150 and the position of the dancer roll depends, to a major degree, on the speeds of driven rolls 60, 70. In normal operation, the operation and speed of both driven rolls are under the control of a controller 130 with the rotations of driven rolls 60 and 70 controlled so that dancer roll 64 will be in approximately the dashed location, i.e., it will be somewhere between, rather than in, the "all the way up" and the "all the way down" positions.

Figure 6:
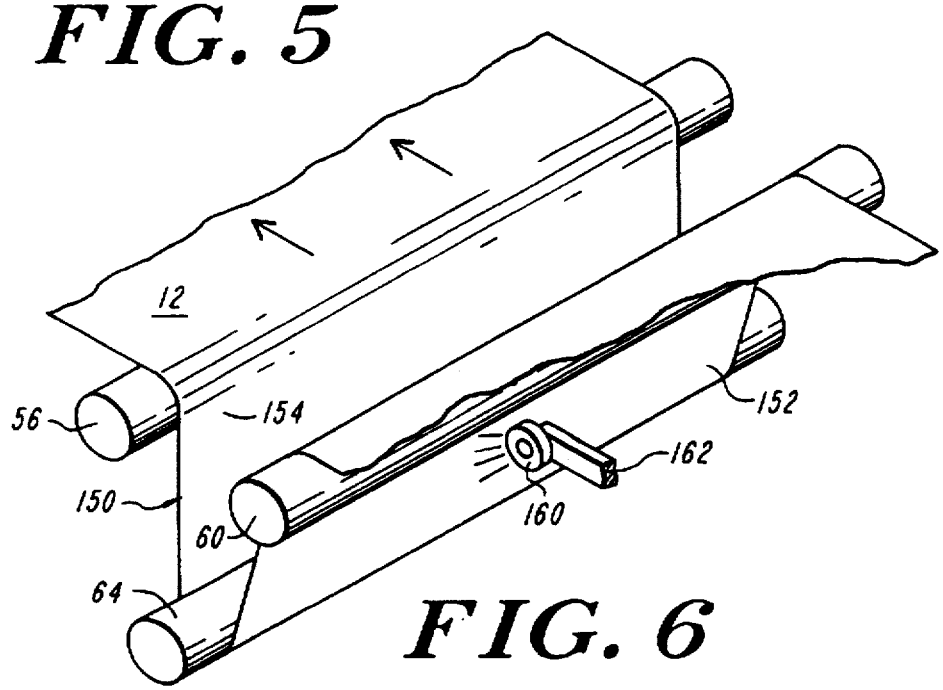
FIG. 6 is a perspective view, partially in section, of the dancer roll portion of the system of FIG. 2.

Referring to FIGS. 2 and 6, it will be seen that loop 150 formed by film 12 passing around the bottom of dancer roll 64 has two generally vertical, but slightly inclined, film sides 152, 154. One side 154 is generally planar and extends from dancer roll 64 to idler roll 56. It has been found that, because of misalignment of the axes of the various rolls and variations in the diameter of the rolls, the weight of dancer roll 64 alone does not provide uniform stress/tension across the width of the film being transported and that, if the ends of dancer roll 64 were not held in slots 66, the axis of dancer roll 64 would tend to be skewed relative to the axes of rolls 60 and 56.

This tendency to skewing and the lack of uniform stress are eliminated by providing a protrusion 160 that engages side 152 of loop 150 and displaces that film away from the plane defined by the lines along which the film tangentially engages the periphery of rolls 60 and 66 and towards film side 154. The point at which the protrusion engages film side 152 is not critical. In the illustrated embodiment, it engages the film near the center of side 152, e.g., at a position transversely approximately midway the width of the film and vertically approximately midway the lines along which the film tangentially engages rolls 56, 60. In the embodiment shown here, protrusion 160 is a wheel 160 mounted for free rotation on a fixed support 162. The distance by which protrusion displaces the portion of film side 152 which it engages is similarly not critical; it needs to be sufficient to insure that dancer roll 64 will move freely in slots 66 with its axis parallel to the sides of the slots and needs to be sufficient to take out the wrinkle from the distorted film.

FIG. 2 also illustrates the manner in which the present invention allows any accumulated skew or rotation of film 12 to be periodically eliminated. As previously indicated, each image recorded by film recorder 10 has a known, predetermined size, e.g., 24 inches (61 cm) long. A short length of "scrap" is typically provided between adjacent images.

In operation, the amount of film 12 fed into recorder 10 is monitored at inlet pinch roll drive 52 by controller 130. When controller 130 determines that a length of film that has been fed is such that the trailing edge of an image has passed beyond precision idler roll 22 (i.e., the complete image has been recorded onto film 12), controller 130 applies a shaft brake 132 to stop rotation of driven rubber roll 60 of inlet pinch roll drive 52. Continued rotation of precision metal drive roll 70 continues to advance film 12, shortening loop 150 of film around dancer roll 64. As the film loop 150 shortens, the dancer roll 64 moves up, until the end(s) of the dancer roll contact(s) the top of slot(s) 66. When dancer roll 64 reaches the top of slots 66 (i.e., reaches the position shown in solid lines in FIG. 2), the film between input drive 52 and output drive 58 becomes taut, and the output drive roll 70 will slip. This slippage permits the film to realign, eliminating accumulated error.

When dancer roll 64 reaches the top of slots 66, it contacts and closes a switch (not shown) that has a built-in delay, and after a short predetermined interval (e.g., a matter of seconds), controller 130 releases brake 132. When brake 132 is released, inlet pinch roll drive 52 again advances film 12 from supply cassette 14 into recorder 10, permitting dancer roll 64 to reform loop 150.

Having described preferred embodiments of the present invention, it should be apparent that modifications and additions can be made without departing from the scope of the appended claims.

What is claimed is:

1. In a film recording system that receives film and records an image on the received film as the film is transported through the system, a drive assembly for transporting the film comprising:
    a driven roll having a precision diameter; and
    a non-driven roll the outer surface of which is defined by a plurality of axially-spaced annular ribs,
    the driven roll and the non-driven roll being spaced sufficiently close together to engage the film therebetween and to transport the film in response to rotation of the driven roll, and
    each of the annular ribs of the non-driven roll having a circumferential surface that is axially-displaceable while in contact with the film.

2. The drive assembly of claim 1 wherein the outer surface of said non-driven roll is defined by a material that is soft relative to the material defining the outer surface of the driven roll.

3. The drive assembly of claim 1 wherein the material defining the outer surface of said non-driven roll is resilient.

4. The drive assembly of claim 3 wherein said material is rubber.

5. The drive assembly of claim 1 wherein said annular ribs comprise a plurality of axially aligned and closely-spaced O-rings.

6. The drive assembly of claim 1 wherein said annular ribs comprise at least one molded ribbed ring having a number of greater diameter portions separated by lesser diameter portions.

7. The drive assembly of claim 1 wherein the non-driven roll includes a shaft and a plurality of axially spaced roll sections coaxially mounted on the shaft.

8. The drive assembly of claim 7 wherein each of the roll sections has a plurality of axially aligned bearings.

9. The drive assembly of claim 8 wherein at least some of the bearings are circled by a plurality of axially aligned and abutting O-rings.

10. The drive assembly of claim 8 wherein at least some of the bearings are circled by at least one molded ribbed ring having a number of greater diameter portions separated by lesser diameter portions.

11. The drive assembly of claim 7 wherein each of the roll sections has an annular flange at each axial end thereof for maintaining the O-rings in place.

12. In a film recording system for receiving and recording on film said film recording system comprising:
    three rolls, each of which is arranged to engage the film as the film passes from the inlet to the recorder,
    a first roll receiving film and being arranged such that the film passes over the first roll,
    a second roll mounted with its axis parallel to that of the first roll and being arranged such that the film passes over the second roll, and
    a third roll between the first and second rolls such that film passing from the first roll to the second roll passes under the third roll, the third roll having an axle with first and second ends and oriented along an axis parallel to those of the first and second rolls;
    said third roll being mounted for generally vertical movement over a continuum of positions between a top position and a bottom position,
    said third roll being urged upwardly by the film engaging the underside thereof and being urged downwardly by the weight thereof,
    the system further including supports with first and second vertical slots in which the respective first and second ends of the axle of the third roll are disposed, the vertical slots preventing the axis of the third roll from skewing relative to the first and second rolls.

13. The film transport system of claim 12 further including a member engaging film passing from said first roll to said third roll at a location intermediate said first and third rolls and displacing the thus-engaged portion of said film in a direction generally perpendicular to the said plane of the film between the first and third rolls.

14. In a film recording system having an inlet that receives film and a recorder that records an image on the received film as the film is transported through the system, a film transport assembly disposed between the inlet and the recorder, said film transport assembly comprising three rolls each of which is arranged to engage the film as the film passes from the inlet to the recorder,
    a first one of said rolls being disposed to receive film from the inlet and being arranged such that the film passes over the first roll,
    a second one of said rolls being mounted with its axis parallel to that of the first roll and being arranged such that the film passes over the second roll and towards the recorder, and
    a third one of said rolls being mounted between the first and second rolls such that film passing from the first roll to the second roll passes under the third roll,
    said third roll being mounted for generally vertical movement over a continuum of positions between a top position and a bottom position,
    said third roll being urged upwardly by the film engaging the underside thereof and being urged downwardly by the weight thereof, and
    a member extending toward and engaging film passing from said first roll to said third roll at a location intermediate said first and third rolls and urging the thus-engaged portion of said film in a direction generally perpendicular to the said plane in which the axis of said third roll moves, wherein said location is substantially at the center of the portion of said film between said first and third rolls.

15. The film transport system of claim 14 wherein the member includes a fixed support and a wheel mounted for rotation relative to said fixed support and positioned to contact the film.

16. In a film recording system having an inlet that receives film and a recorder that records an image on the received film as the film is transported through the system, a film transport assembly disposed between the inlet and the recorder, said film transport assembly comprising three rolls each of which is arranged to engage the film as the film passes from the inlet to the recorder,
    a first one of said rolls being disposed to receive film from the inlet and being arranged such that the film passes over the first roll,
    a second one of said rolls being mounted with its axis parallel to that of the first roll and being arranged such that the film passes over the second roll and towards the recorder, and a third one of said rolls being mounted between the first and second rolls such that film passing from the first roll to the second roll passes under the third roll, said third roll being mounted for generally vertical movement over a continuum of positions between a top position and a bottom position, said third roll being urged upwardly by the film engaging the underside thereof and being urged downwardly by the weight thereof, wherein the third roll has an axle, the transport system further comprising supports with generally vertical slots for receiving opposite end portions of said axle and permitting said vertical movement of said third roll.

17. In a film recording system having an inlet that receives film and a recorder that records an image on the received film as the film is transported through the system, a film transport assembly disposed between the inlet and the recorder, said film transport assembly comprising:

three rolls, each of which is arranged to engage the film as the film passes from the inlet to the recorder, a first one of said rolls being disposed to receive film from the inlet and being arranged such that the film passes over the first roll, a second one of said rolls being mounted with its axis parallel to that of the first roll and being arranged such that the film passes over the second roll and towards the recorder, and a third one of said rolls being mounted between the first and second rolls such that film passing from the first roll to the second roll passes under the third roll; and a member engaging film passing from said first roll to said third roll at a location intermediate said first and third rolls and displacing the thus engaged portion of said film in a direction generally perpendicular to a plane of the film between the first roll and the third roll.

18. The film transport system of claim 17 wherein the member includes a fixed support and a wheel mounted for rotation relative to said fixed support and positioned to contact the film.

19. The assembly of claim 17, wherein the third roll is a dancer roll mounted for vertical movement relative to and between the first and second rolls.

20. The assembly of claim 17, wherein the third roll has an axle, the transport system further including first and second vertical slots, the ends of the axle disposed in the vertical slots.

21. In a film recording system having an inlet that receives film and a recorder that records an image on the received film as the film is transported through the system, a film transport assembly disposed between the inlet and the recorder, said film transport assembly comprising:

three rolls each of which is arranged to engage the film as the film passes from the inlet to the recorder, a first one of said rolls being disposed to receive film from the inlet and being arranged such that the film passes over the first roll, a second one of said rolls being mounted with its axis parallel to that of the first roll and being arranged such that the film passes over the second roll and towards the recorder, and a third one of said rolls being mounted between the first and second rolls such that film passing from the first roll to the second roll passes under the third roll, and a member engaging film passing from said first roll to said third roll at a location substantially at the center of the portion of said film between said first and third rolls.

22. In a film recording system having an inlet drive assembly that receives film and transports the received film into the system, the inlet drive assembly including an inlet drive roll for receiving film from a film supply, an outlet drive assembly that transports film out of the system after an image has been recorded on the film, and a recording mechanism between the inlet drive assembly and the outlet drive assembly for recording the image on the film, the improvement comprising:

a brake coupled to the inlet drive roll for stopping the inlet drive roll from receiving film into the system while maintaining engagement between the film and the inlet drive roll, and a controller operatively coupled to the outlet drive assembly and the brake, the controller, monitoring a length of film transported by the outlet drive assembly, applying the brake to the inlet drive roll to stop transport of film by the inlet drive after a predetermined length of film has been transported by the outlet drive assembly, continuing to permit transport of film by the outlet drive assembly until such continued transport has resulted in slippage of film at the outlet drive assembly, and releasing the brake to allow additional film to be transported into the system by the inlet drive roll.

23. The system of claim 22 wherein said controller permits said transport of film by said outlet drive assembly until such continued transport has caused film between said inlet drive assembly and said outlet drive assembly to become taut, and thereafter permits said outlet drive assembly to transport film for a predetermined period of time to cause said slippage.

24. The system of claim 22 wherein said controller monitors the length of film transported by said outlet drive system after said brake has been released.

25. The system of claim 22, wherein the inlet drive assembly includes three rolls, each of which is arranged to engage the film as the film passes from the inlet drive roll of the inlet drive assembly to the outlet drive assembly, a first one of said rolls being disposed to receive film from the inlet drive roll and being arranged such that the film passes over the first roll, a second one of said rolls being mounted with its axis parallel to that of the first roll and being arranged such that the film passes over the second roll and thereafter to the outlet drive assembly, and a third one of said rolls being mounted between the first and second rolls such that film passing from the first roll to the second roll passes under the third roll, said third roll being mounted for generally vertical movement over a continuum of positions between a top position and a bottom position, being urged upwardly by the film engaging the underside thereof and being urged downwardly by the weight thereof, said controller being responsive to upward movement of said third roll for releasing said brake.

26. A method for operating a film recording system having an inlet drive assembly that receives film and transports the received film into the system, an outlet drive assembly that transports film out of the system after an image has been recorded on the film, a recording mechanism between the inlet drive assembly and the outlet drive assembly for recording the image on the film, said method comprising:

monitoring a length of film transported by the outlet drive assembly, applying a brake to the inlet drive assembly to stop transport of film by the inlet drive assembly after a predetermined length of film has been transported by the outlet drive assembly, continuing to permit transport of film by the outlet drive assembly until such continued transport has resulted in slippage of film at the outlet drive assembly, and releasing the brake to allow additional film to be transported into the system by the inlet drive assembly.

27. The method of claim 26 including permitting said transport of film by said outlet drive assembly until such continued transport has caused film between said inlet drive assembly and said outlet drive assembly to become taut, and thereafter permitting said outlet drive assembly to transport film for a predetermined period of time to cause said slippage and then releasing the brake.

28. The system of claim 26 including monitoring the length of film transported by said outlet drive system after said brake has been released.

29. The method of claim 27, further comprising receiving a signal from a dancer roll under which the film passes, the signal indicating that the film has become taut.

30. In a system that transports film, a non-driven roll against which film passes, the non-driven roll having an outer surface defined by a plurality of axially-spaced annular bearings having circumferential surfaces displaceable along the axial direction while in contact with the film.

31. The system of claim 30, wherein the annular bearings have a plurality of axially aligned and closely-spaced O-rings.

32. The system of claim 30, wherein the annular bearings each have at least one molded ribbed ring having greater diameter portions separated by lesser diameter portions.

33. A film recording system comprising:

an inlet drive assembly that receives film and transports the received film;

an outlet drive assembly that transports film out of the system after an image has been recorded on the film;

a recording mechanism between the inlet drive assembly and the outlet drive assembly for recording the image on the film;

a brake coupled to the inlet drive assembly for stopping the inlet drive assembly from transporting film into the system; and a controller operatively coupled to the outlet drive assembly and to the brake, the controller for monitoring a length of film transported by the outlet drive assembly, applying the brake to the inlet assembly to stop transport of film by the inlet drive assembly after a predetermined length of film has been transported by the outlet drive assembly, continuing to permit transport of film by the outlet drive assembly so that the film becomes taut from the input drive assembly to the outlet drive assembly, and releasing the brake to allow additional film to be transported into the system by the inlet drive assembly.

\* \* \* \* \*